Dec. 26, 1922.

A. J. BAZELEY.
COUPLING CENTERING AND SUPPORTING MECHANISM.
FILED APR. 9, 1920.

1,440,052

5 SHEETS-SHEET 1

Inventor
Arthur J. Bazeley
By his Attorney
Clarence D. Kerr

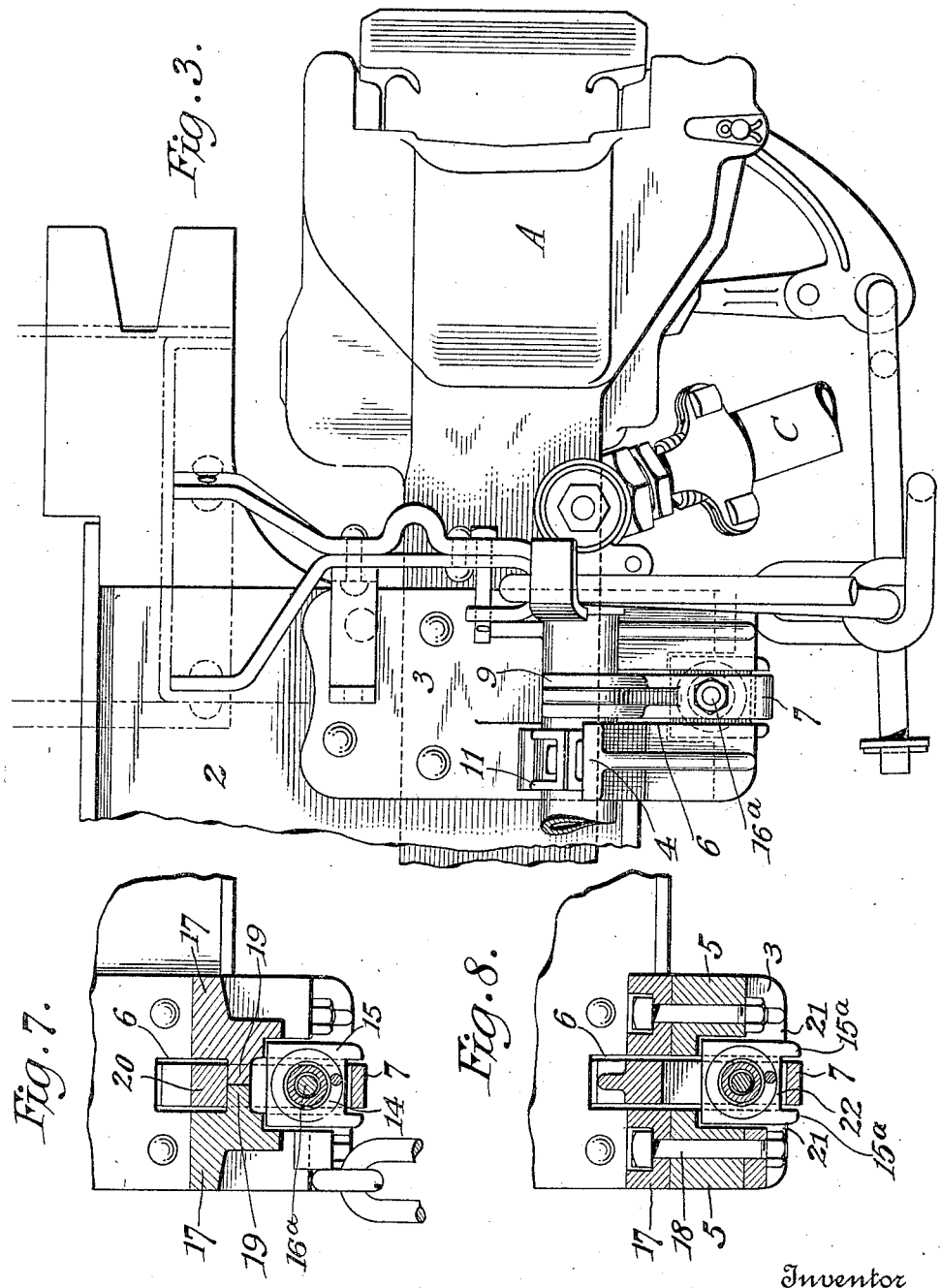

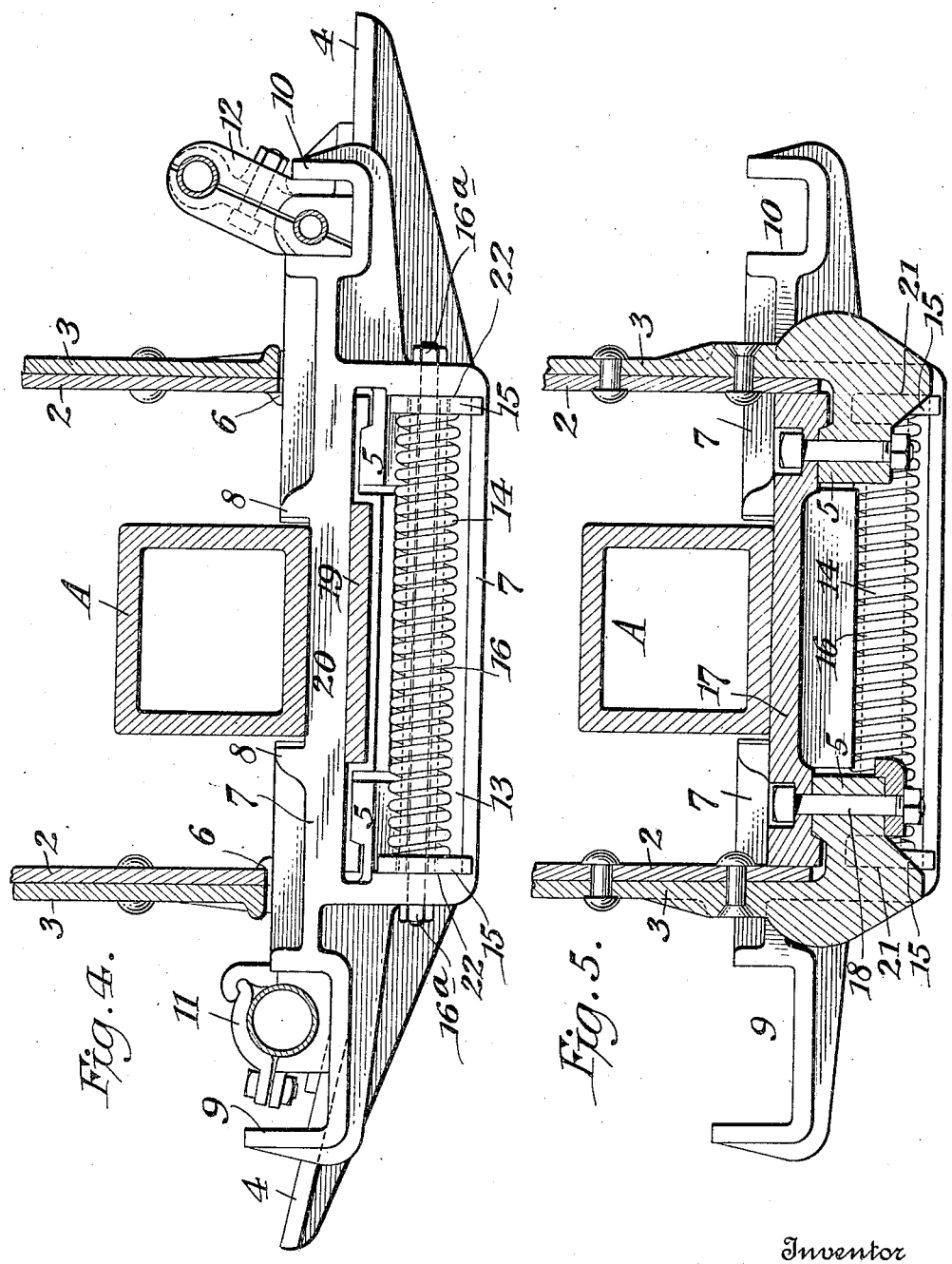

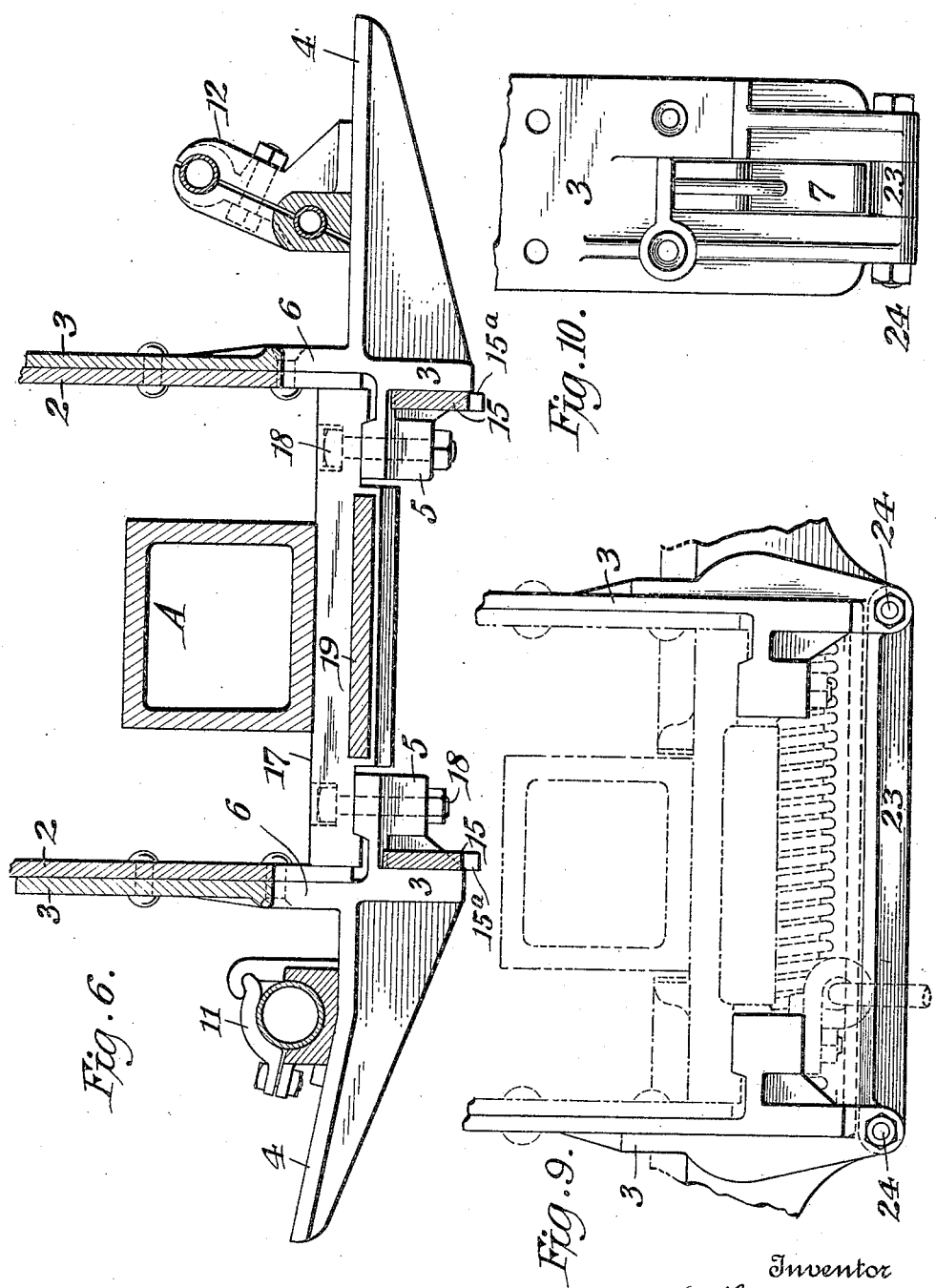

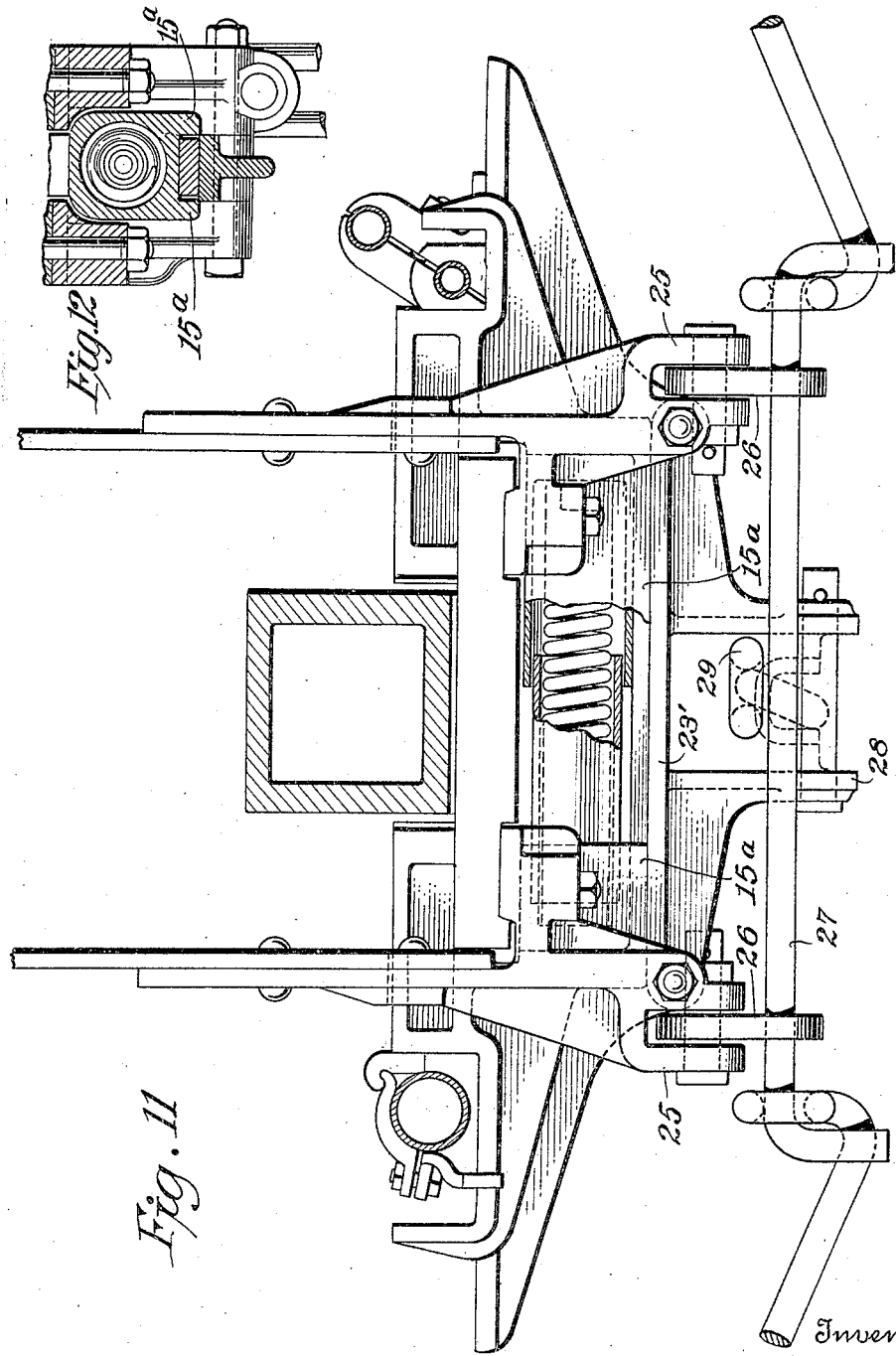

Patented Dec. 26, 1922.

1,440,052

UNITED STATES PATENT OFFICE.

ARTHUR J. BAZELEY, OF CLEVELAND, OHIO, ASSIGNOR TO THE NATIONAL MALLEABLE CASTINGS COMPANY, OF CLEVELAND, OHIO, A CORPORATION OF OHIO.

COUPLING CENTERING AND SUPPORTING MECHANISM.

Application filed April 9, 1920. Serial No. 372,421.

*To all whom it may concern:*

Be it known that I, ARTHUR J. BAZELEY, a citizen of the United States, residing at Cleveland, Cuyahoga County, Ohio, have invented new and useful Improvements in Coupling Centering and Supporting Mechanisms, of which the following is a specification, reference being had to the accompanying drawings, in which—

Figure 1:
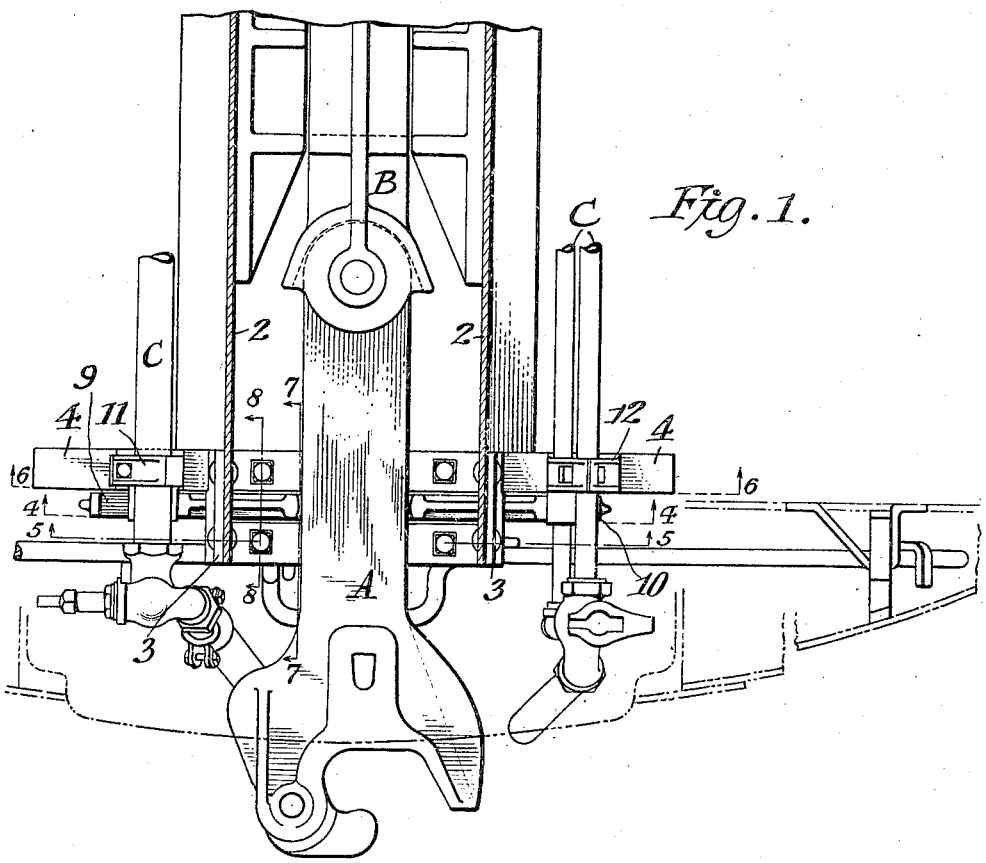
Figure 2:
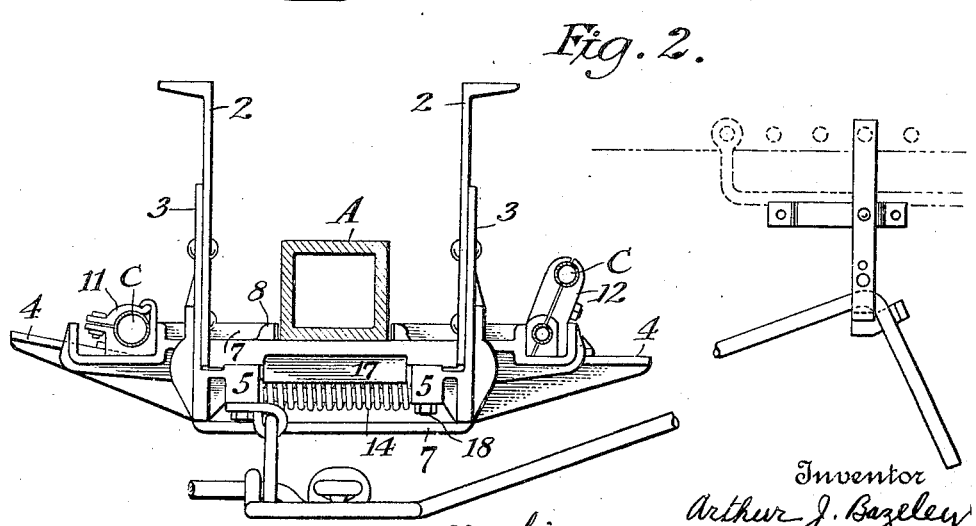

Fig. 1 is a plan view of my improved centering and supporting mechanism; Fig. 2 is a front elevation thereof; Fig. 3 is a side elevation thereof; Figs. 4, 5, 6, 7 and 8 are sections on lines 4—4, 5—5, 6—6, 7—7 and 8—8, respectively, of Fig. 1; Fig. 9 shows a modified form of the supporting brackets; Fig. 10 is a side elevation thereof; Fig. 11 shows in elevation a modified form of my invention, and Fig. 12 is a section thereof.

My invention relates to cars in which the coupler is mounted to angle laterally, and in which provision must be made for centering the coupler and for supporting and carrying the train pipes during the angling movements of the coupler. To this end my invention comprises a novel coupler centering mechanism, which also supports the train pipes and moves them laterally with the coupler in such manner as to prevent interference or damage from the coupler during its angling movements or the other parts with which they might be brought into contact. My invention also consists in the construction and arrangement of parts which I shall hereinafter describe and claim.

Referring to the drawings, A indicates the coupler pivoted to the yoke B, and C are the train pipes. Depending from the car are the usual draft sills 2, to which are secured the supporting brackets 3, which have outward extensions 4 and inward projections 5. The supporting brackets 3 and sills 2 have transverse aligned slots 6 therein for the reception of the centering casting 7, which has lugs 8 engaging the coupler shank and which works through the slots 6. The centering casting 7 also has jaws 9 and 10, within which, respectively, the train pipe clamps 11 and 12 seat.

The recess 13 in the centering casting 7 is for the reception of the centering spring 14 and followers 15, which are retained in the opening by the tubular spring retainer 16 and the through bolt 16ª. The coupler supports 17, when the spring 14, followers, retainer and bolt are in position, are slid horizontally from fore and aft of the centering casting 7 into the recess 13 and rest on the projections 5 of the brackets 3, and are secured to such projections by bolts 18. The lugs 19 on the supports 17 meet beneath the middle portion 20 of the centering casting 7 and thereby support it. The spring followers 15 when in operative position bear against the brackets 3 at the points 21 and against the centering casting 7 at the points 22, and are provided with depending lugs 15ª which straddle the lower member of the casting and serve to steady and guide the spring followers.

When lateral movement of the coupler shank in one direction is imparted through the lugs 8 to the centering casting 7, the movement of the casting 7 will carry with it the train pipes C secured in the jaws 9 and 10 by the clamps 11 and 12, which slide along the extensions 4 and thereby keep the train pipes C the proper distance from the coupler head.

The movement of the centering casting 7 carries with it one of the spring followers 15 and through it will compress the spring 14. The other spring follower 15 will remain stationary because of its bearing against the points 21 on the bracket 3. When the pressure on the spring 14 is relaxed, it will return the centering casting 7 to normal centering position, and with it the coupler shank and the train pipe C.

If desired, one or both of the extensions 4 may be inclined, as is shown at the left-hand side of Figs. 2, 4 and 6, to assist the return of a train pipe to normal position by gravity.

In Figs. 9 and 10 I have shown a modified form of my invention in which the supporting brackets 3 have their lower extremities tied together by a bar 23 to keep them from spreading. The bar 23 is secured to the brackets by the bolts 24. The bar 23 will also prevent the coupler supports from falling out in the event of displacement or breakage.

In Fig. 11 I have shown a further modification of my invention in which the supporting brackets are provided with jaws 25 in which links 26 are secured which support an uncoupling rod 27. The tie casting 23′ is likewise provided with a jaw 28 through which the lifting link 29 of the uncoupling mechanism extends. The followers are shown as tubular in form, supporting and completely housing the spring from the weather, one being made of greater diameter than the other so that they may telescope as the spring is compressed.

My invention has the advantage of providing in a compact, simple and serviceable form a coupler centering device, which at the same time serves to support the train pipes and keep them a sufficient distance away from the coupler head as it angles, so that it will not interfere with or engage the angle cocks.

The terms and expressions which I have employed are used as terms of description and not of limitation, and I have no intention, in the use of such terms and expressions, of excluding any mechanical equivalents of the features shown and described, or portions thereof but recognize that various structural modifications are possible within the scope of the invention claimed.

What I claim is—

1. In a coupler centering device, a coupler mounted to angle laterally, depending members secured to the underframing of a car having aligned slots extending transversely, a centering member engaging the coupler shank and movable with the coupler transversely in said slots, means attached to the depending members upon which the centering member moves, and a spring mechanism carried by the centering member and engaging the said member and a part immovable to the car.

2. In a coupler centering device, a coupler mounted to angle laterally, a coupler centering member movable transversely of the car and engaging the coupler shank, depending members attached to the underframing of the car, means securing together the depending members and carrying the centering member, said centering member supporting a spring mechanism comprising a spring and followers, said followers engaging the centering member and a part immovable to the car.

3. In a coupler centering device, a coupler mounted to angle laterally, a centering member engaging the coupler shank, depending members attached to the underframing of a car, a load carrying member between the depending members and carrying the centering member, said centering member supporting a spring centering mechanism comprising a spring and followers, said followers engaging and operable between the centering member and a part immovable to the car, the centering member also carrying laterally extending train pipe engaging means adapted to maintain the train pipe connections a predetermined distance from the coupler head as it angles laterally.

4. In a coupler centering device, a coupler mounted to angle laterally, depending members secured to the underframing of a car, a centering member engaging the coupler shank and movable transversely with the coupler, load carrying members secured to the depending members and having a supporting engagement with a recessed portion of the said centering member, a spring mechanism also mounted in said recessed portion of the centering member and comprising a spring and followers, said followers engaging the centering member and the depending members, whereby movement of the coupler laterally in either direction will be resisted by the compression of the spring between a follower bearing on the said member and a follower bearing on a depending member.

5. In a coupler centering device, a coupler mounted to angle laterally, depending members secured to the underframing of a car, a centering member engaging the coupler shank and movable with the coupler transversely to the car, load carrying means attached to the depending members and forming a bearing for the centering member, a spring centering mechanism engaging the centering member and the depending members, the centering member also carrying train pipe connections, whereby, when the coupler angles laterally, the train pipe connections will be maintained at a predetermined distance from the coupler.

6. In a coupler centering device, a coupler mounted to angle laterally, members depending from the car slotted transversely for the reception of a coupler centering member, said coupler centering member being supported upon a load carrying element secured to the depending members and being actuated to move transversely in said slots by the coupler as it angles laterally, and a spring in the centering member for returning the centering member and with it the coupler to normal position.

7. In a coupler centering device, a coupler mounted between members depending from the underframing of a car to angle laterally, a coupler centering member engaging the coupler and extending laterally outside the depending members, the centering member having jaws outside the depending members arranged to engage the train pipe connections, supporting means for the centering member immovable to the car, the centering member being movable laterally with the coupler and carrying the train pipe connections with it, and a spring having a bearing on the centering member and operable to cause the centering member and through it the coupler and train pipe connections to return to normal position.

8. In a coupler centering device, a coupler mounted to angle laterally, a coupler centering member engaging the coupler and having extensions by which train pipe connections are engaged, the centering member being movable laterally with the coupler and carrying the train pipe connections with it, supporting means for the centering member immovable to the car, and a spring carried by the centering member operable to cause the centering member, and through it the coupler and train pipe connections, to return to normal position, said centering member and spring being removable as a unit.

9. In a coupler centering device, a coupler mounted to angle laterally, a coupler centering member engaging the coupler shank, depending members secured to the underframing of the car and supporting the coupler centering member, and a spring mechanism having followers straddling the centering member and engaging the depending members.

ARTHUR J. BAZELEY.